(12) United States Patent
Kahne et al.

(10) Patent No.: US 11,009,094 B1
(45) Date of Patent: May 18, 2021

(54) SYSTEM AND METHOD FOR USING A PISTON FACE AND SHIM IN A SHOCK ABSORBER WITH VARYING PORT CONFIGURATIONS

(71) Applicant: Factory Kahne, LLC, Enumclaw, WA (US)

(72) Inventors: Willis D. Kahne, Enumclaw, WA (US); Kole S. Kahne, Enumclaw, WA (US)

(73) Assignee: Factory Kahne, LLC, Enumclaw, WA (US)

( * ) Notice: Subject to any disclaimer, the term of this patent is extended or adjusted under 35 U.S.C. 154(b) by 0 days.

(21) Appl. No.: 17/144,763

(22) Filed: Jan. 8, 2021

(51) Int. Cl.
| | |
|---|---|
| *F16F 9/348* | (2006.01) |
| *F16F 9/32* | (2006.01) |
| *B60G 13/08* | (2006.01) |
| *F16F 9/19* | (2006.01) |
| *B60G 17/08* | (2006.01) |
| *F16F 9/512* | (2006.01) |

(52) U.S. Cl.
CPC ............ *F16F 9/3214* (2013.01); *B60G 13/08* (2013.01); *B60G 17/08* (2013.01); *F16F 9/19* (2013.01); *F16F 9/348* (2013.01); *F16F 9/5126* (2013.01); *B60G 2202/24* (2013.01); *B60G 2204/62* (2013.01); *B60G 2206/41* (2013.01); *B60G 2300/00* (2013.01); *B60G 2300/07* (2013.01); *B60G 2300/12* (2013.01); *B60G 2500/112* (2013.01); *B60G 2600/21* (2013.01); *B60G 2800/162* (2013.01); *F16F 2222/12* (2013.01); *F16F 2228/066* (2013.01); *F16F 2230/183* (2013.01); *F16F 2232/08* (2013.01); *F16F 2234/02* (2013.01)

(58) Field of Classification Search
CPC ........ F16F 9/32; F16F 9/34; F16F 9/50; F16F 9/52; F16F 9/348
USPC ...... 188/282.1, 282.5, 282.6, 322.15, 322.22
See application file for complete search history.

(56) References Cited

U.S. PATENT DOCUMENTS

| | | | | |
|---|---|---|---|---|
| 6,460,664 | B1* | 10/2002 | Steed | F16F 9/348 |
| | | | | 188/282.1 |
| 9,194,455 | B2* | 11/2015 | Ashiba | F16F 9/348 |
| 9,897,159 | B2* | 2/2018 | Marble | F16F 9/3485 |
| 2004/0069581 | A1* | 4/2004 | Shinata | F16F 9/348 |
| | | | | 188/322.15 |

(Continued)

FOREIGN PATENT DOCUMENTS

WO 2012116190 A1 8/2012

*Primary Examiner* — Christopher P Schwartz
(74) *Attorney, Agent, or Firm* — Houda El-Jarrah; Thomas E. LaGrandeur; Bold IP, PLLC

(57) ABSTRACT

One or more systems are disclosed for controlling dampening forces provided by a shock absorber by means of a piston face and an additional dampening shim underneath the piston face in the shock absorber. The piston face is coupled to a piston and the dampening shim is positioned beneath a bottom surface of the piston face. The piston face includes a first set of openings and a second set of openings on the piston face that have differing sizes and diameters. The dampening shim has a diameter that is less than the diameter of the piston face. When fluid pressure is applied against the underside of the dampening shim, the dampening shim partially blocks the first set of openings and fully blocks the second set of openings on the piston face from the bottom of the piston face, which thereby affects the overall dampening of the shock absorber.

20 Claims, 10 Drawing Sheets

(56) References Cited

U.S. PATENT DOCUMENTS

| | | | |
|---|---|---|---|
| 2005/0056505 A1* | 3/2005 | Deferme | F16F 9/3485 |
| | | | 188/322.15 |
| 2010/0294604 A1* | 11/2010 | Morita | F16F 9/3481 |
| | | | 188/283 |
| 2020/0003272 A1* | 1/2020 | Yamashita | F16F 9/437 |

* cited by examiner

SYSTEM AND METHOD FOR USING A
PISTON FACE AND SHIM IN A SHOCK
ABSORBER WITH VARYING PORT
CONFIGURATIONS

FIELD OF THE DISCLOSURE

The present invention relates to shock absorbers, and more particularly, to an improved system for varying dampening forces in a single shock absorber in order to provide a single shock absorber that is capable of adapting to varying road conditions for a vehicle containing the shock absorber.

BACKGROUND

Hydraulic shock absorbers are hydraulic oil pump like devices that help to control the impact and rebound movement of a vehicle's springs and suspension. The shock absorber is a device used to dampen shock and vibration, and mainly controls and absorbs suspension movement on a vehicle. Along with smoothing out bumps and vibrations and controlling the suspension system of a vehicle, one of the key roles of the shock absorbers on a vehicle is to ensure that the vehicle's tires remain in contact with the road surface at all times, which ensures the safest control and braking response from a vehicle. At rest or in motion, the bottom surface of one's tires is the only part of a vehicle in contact with the road, which means that any time that a tire's contact with the ground is broken or reduced, the ability to drive, steer and brake is severely compromised.

When a vehicle is in motion, the components within the shock absorber dampen the energy of the movement of the vehicle's suspension system (which includes springs) by forcing oil through orifices and holes of a piston in the shock absorber. The shock absorber regulates how quickly the suspension moves through its travel in compression and rebound. Compression—also known as bump—describes the shock absorber's behavior when the suspension system of a vehicle is compressed. The rebound phase—also known as jounce—occurs when the suspension system of a vehicle is not compressed and extends.

Shock absorbers dampen the suspension's motions by converting the kinetic energy of the up and down movements of the suspension system's springs into heat energy. Without shock absorbers, the springs of the suspension system would be allowed to oscillate uncontrollably and would cause the tires of the vehicle to lose contact with the road surface and the vehicle's performance to behave erratically.

Shock absorbers are tuned to improve the timing of the suspension movements and give the driver more control, which is particularly useful in dirt track racing. The elastic movement of a vehicle's suspension can be modulated and adjusted based on the dampening forces applied by the shock absorber, thereby considerably improving safety, comfort, and speed of the vehicle when the vehicle is in use.

A shock absorber can provide high speed and low speed damping. The terms high speed damping and low speed damping refer to how fast the piston rod or shaft of a shock absorber is moving within the shock absorber, as well as how fast the fluid velocity is moving in the shock absorber because the speed of the piston rod matches the speed of the fluid in the shock absorber.

Low-speed damping or dampening of the shock absorber usually occurs when the surface on which a vehicle is driving is relatively smooth and does not include a great deal of obstacles or roughness. There is less resistance by the shock absorber and less resistance applied to the suspension when the road surface or track surface is smooth. Accordingly, even if the racing vehicle or another vehicle is moving quickly, the suspension system is moving up and down somewhat slowly.

High speed damping or dampening of a shock absorber often occurs when the surface is rough and uneven and affects how a vehicle reacts to surface irregularities, such as potholes, road bumps, or the rough terrain of a dirt track surface. High speed dampening of a shock absorber is often overlooked but is very critical because high speed damping of a shock absorber gives strength to low speed damping and the balance of the two together becomes more important as the grip level of the racetrack goes down. On dirt track racing, in particular, where the terrain varies greatly, low speed and high speed dampening by the shock absorber becomes more important and more dependent on each other because of the tires sudden lack of grip and quick changes in the conditions of the surface of the racetrack.

In a shock absorber, a piston is attached to the end of the piston rod and works against hydraulic fluid in the pressure tube of the shock absorber. As the connected suspension system of the vehicle travels up and down, the hydraulic fluid (which is usually oil) is forced through tiny holes, called orifices, inside the piston. The shock absorber's shaft or piston rod and internal piston are designed to move in two directions, which is in and out, which as noted before is called compression and rebound.

Compression damping is typically used to maximize the chassis' grip and control the unsprung weight of the vehicle. Track surfaces or road surfaces that require more grip can require more compression damping, while slick conditions call for much less compression damping. Compression becomes more important when the speed required at a particular racetrack is factored in as well as the spring rates of the suspension system of a vehicle and the total amount of weight moving in the racing vehicle.

While their inner workings are hidden from view, the impact of shock absorbers on the performance of a vehicle is significant. While it is important in any type of driving of any type of vehicle to have properly functioning shock absorbers, for racing vehicles that race on dirt tracks or other racetracks, it is critical for the proper shock absorbers to be included on a racing vehicle and that the shock absorber is properly configured and tuned to respond to the particular road conditions for a particular course or track that the racing vehicle will encounter.

Race car drivers and drivers of other types of racing vehicles (including but not limited to motorcycles or utility terrain vehicle (UTVs)), must be able to maintain control of their vehicles at all times while also being able to drive very fast over rough terrain. It is imperative to provide balance to the weight of the race car and control over a track's surface. Having the proper amount of dampening to accommodate the conditions a racing vehicle may encounter is very important because providing too much dampening or too little dampening from the shock absorber will change everything in how the vehicle performs and may cause the vehicle driver to lose a race.

Further, if a race track is a dirt track as is used in dirt racing, the tuning of shock absorbers is particularly more cumbersome to the technician responsible for the shock absorbers as multiple shock absorbers are typically changed during the course of a race on a dirt track to accommodate stretches of terrain on the dirt track that are smooth and even which require different shock absorbers than when stretches of terrain on a dirt track include more obstacles, such as hills, potholes, bumps, or other types of uneven surfaces. Changing out the shock absorbers to accommodate varying types of track surfaces becomes time consuming and expensive. Typically, a race team purchases dozens of shock absorbers, as well as the components included (e.g., pistons, piston faces, shims) and must replace the shock absorbers and/or internal components of the shock absorbers throughout a race or race weekend as the suspension system of a vehicle is modified and adjusted for optimal performance.

It is desirable if a single shock absorber has the ability to vary the dampening conditions to properly respond to varying road conditions. Accordingly, there is still an unsolved need for an improved shock absorber and dampening system that may be suitable in particular for when a driver requires higher dampening forces for rougher terrain road conditions and lower dampening forces for when the road conditions are smooth and slick, especially when used in a racing vehicle.

SUMMARY

One or more embodiments are provided below for a shock absorber, whereby the shock absorber includes a shock absorber body, a piston rod, and a piston coupled to the piston rod. The piston includes a central opening through which the piston rod protrudes. The piston has a compression side and a rebound side, whereby fluid included within a body of the shock absorber is configured to flow between either the compression side and the rebound side of the piston or between the rebound side of the piston and the compression side or between both sides. A piston face is coupled to the piston. The piston face has a top surface, a bottom surface, and a central bore extending through the piston face. The piston face includes a bottom lip that extends down from the bottom surface of the piston face, whereby the bottom lip extends along the circumference of the piston face on the bottom surface of the piston face. A first set of openings and a second set of openings are disposed on the top surface of the piston face and extend through to the bottom surface of the piston face. In one or more non-limiting embodiments, the first set of openings may have a different diameter than the diameter for the second set of openings. Further, the centerline of the first set of openings may not be aligned with the centerline of the second set of openings, such that the centerline of the first set of openings may be higher than the centerline for the second set of openings. In other cases, the centerline of the second set of openings may be higher than the centerline for the first set of openings.

The piston face for the shock absorber may include a cylindrical portion or ridge integrated into the bottom surface of the piston face that defines the central bore of the piston face and extends in a 360 degree direction around the central bore of the piston face. A taper is included in the bottom surface of the piston face and extends at an angle between the bottom lip and the cylindrical portion of the piston face. The first set of openings and the second set of openings are disposed between the bottom lip and the cylindrical portion of the piston face.

Notably, a shim is included in the shock absorber, wherein the shim is intended to be located beneath the bottom surface of the piston face. The shim includes a top surface, bottom surface, and central opening, wherein the piston rod is configured to be inserted through the central opening of the shim and then through the central opening of the piston face. The shim is configured to lay flat beneath the bottom surface of the piston face in an open position and to deflect and to bend upwards towards the bottom surface of the piston face in a closed position, whereby when the shim is in the closed position, the shock absorber provides higher force dampening than when the shim is in the open position.

According to an exemplary method of using the shock absorber as described above in one or more non-limiting embodiments, the method may include flowing fluid through the shock absorber. The method may include flowing fluid through all the first set of openings and through all of the second set of openings of the piston face, whereby the shim is in an open position and not bent or deflected against the bottom surface of the piston face, which occurs when the fluid velocity is below a threshold level. If the fluid velocity reaches a threshold level, then the method includes restricting fluid flow through the piston face, wherein the underlying shim converts to a closed position whereby the shim is bent and deflected against the tapered bottom surface of the piston face such that the shim blocks an entirety of the second set of openings. While fluid may still flow through a portion or all of the first set of openings, when the shim is in the closed position, the flow is restricted through the second set of openings, which causes either the compression side or the rebound side of the shock absorber to be stiffer and results in greater dampening forces from the shock absorber depending on where the piston face and the shim are positioned (i.e., either on the compression side of the shock absorber or the rebound side or both sides).

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
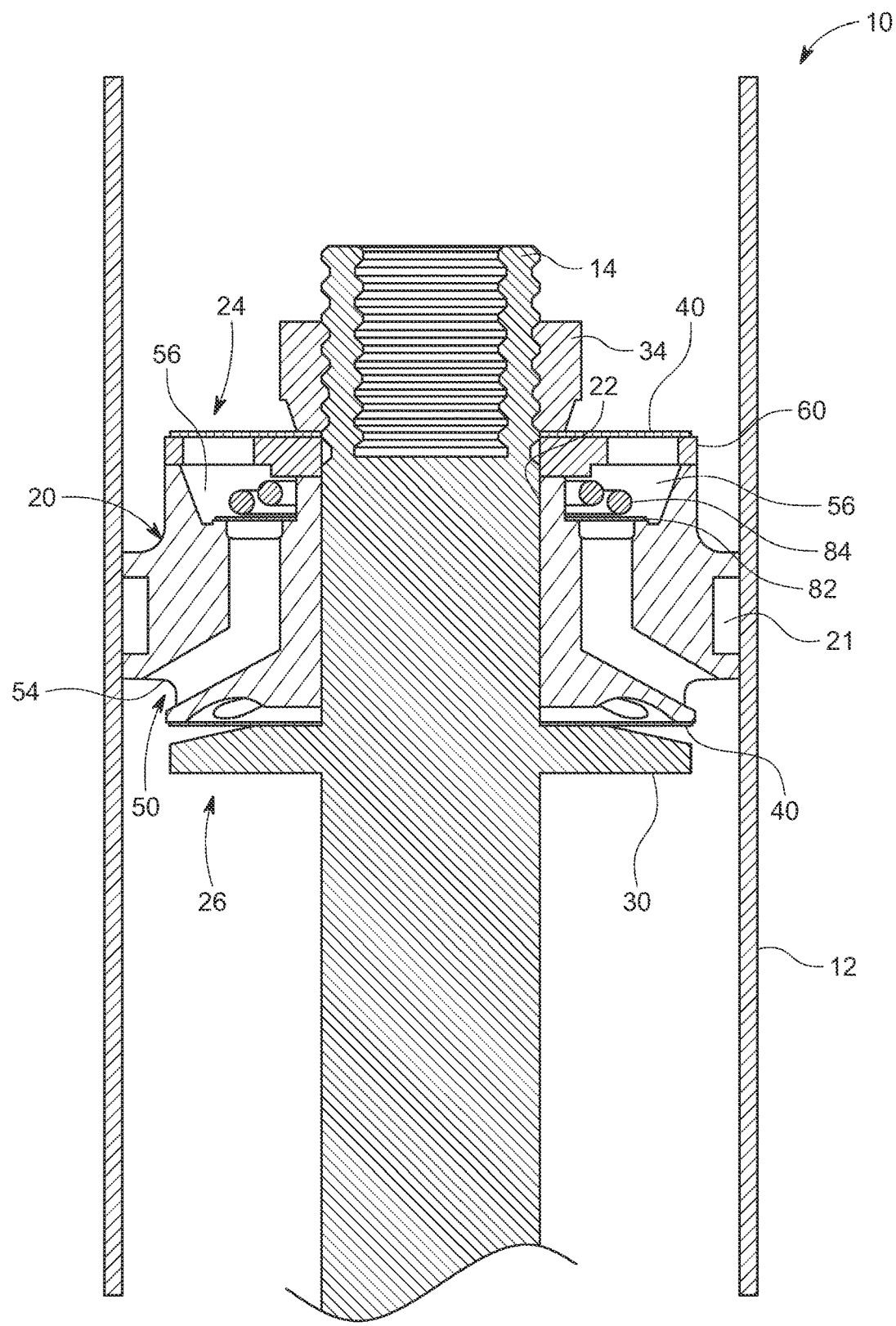
FIG. 1 is a cross-sectional view of a prior art shock absorber in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

The present disclosure is generally drawn to various embodiments for a shock absorber having a unique dampening assembly that includes a piston face and shim configured to be positioned beneath the piston face. The unique dampening assembly allows for varying port configurations of the piston face in order to control and adjust the dampening force applied by the shock absorber to the suspension system of a vehicle. The shock absorber with the unique piston face and underlying shim may be used in many applications. It may be particularly useful in racing vehicles to include a single shock absorber capable of varying the dampening forces using the described piston face and underlying shim assembly.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

FIG. 1 displays a prior art system for a shock absorber, such as shock absorber 10, for use with a vehicle. The shock absorber 10 comprises a cylindrical shock body 12 that surrounds a movable piston 20 and main shaft 14. The term "shaft" as used herein may interchangeably be used with "piston rod" or "rod." The shock absorber 10 is positioned between and operably connected to the vehicle wheel system and chassis (not shown) and servers to dampen the forces applied to the vehicle through the driving surface, steering input, and other factors. In particular, the movable piston 20 defines a central opening 22 that receives the main shaft 14 and is secured in place by a top plate 30 and a nut 34 that is threaded to the main shaft 14. A piston wear band 21 is disposed between the piston 20 and the shock body 12 to allow sliding but sealed movement of the piston 20 within the shock body 12. The piston 20 could be mounted or secured in the shock absorber body 12 in any number of ways that are contemplated by those of skill in the art. A fluid (not shown in FIG. 1), such as oil, is sealed within the shock absorber body 12 and as the piston 20 oscillates within the shock absorber body 12, the fluid passes through the piston as described herein. Such movement generates heat, and therefore the materials used in the shock absorber 10 are robust, including without limitation metals such as steel, titanium, aluminum, other metals, and alloys thereof, as well as polymeric, natural, and composites and combinations thereof. The movement of the oil through the piston 20 and shock absorber is controlled using orifices and bleed valves in piston 20 and components of the shock absorber.

In addition to defining the central opening 22, the piston 20 has a rebound side 24 and a compression side 26 which each define one or more ports 50 that pass through the piston 20 and include an intake port 54 and an exhaust port 56. The intake ports 54 are arranged or positioned on the piston 20 so that fluid flows in the intake ports 54 and, if unobstructed, would flow through the piston 20 and out the exhaust ports 56.

Figure 5:
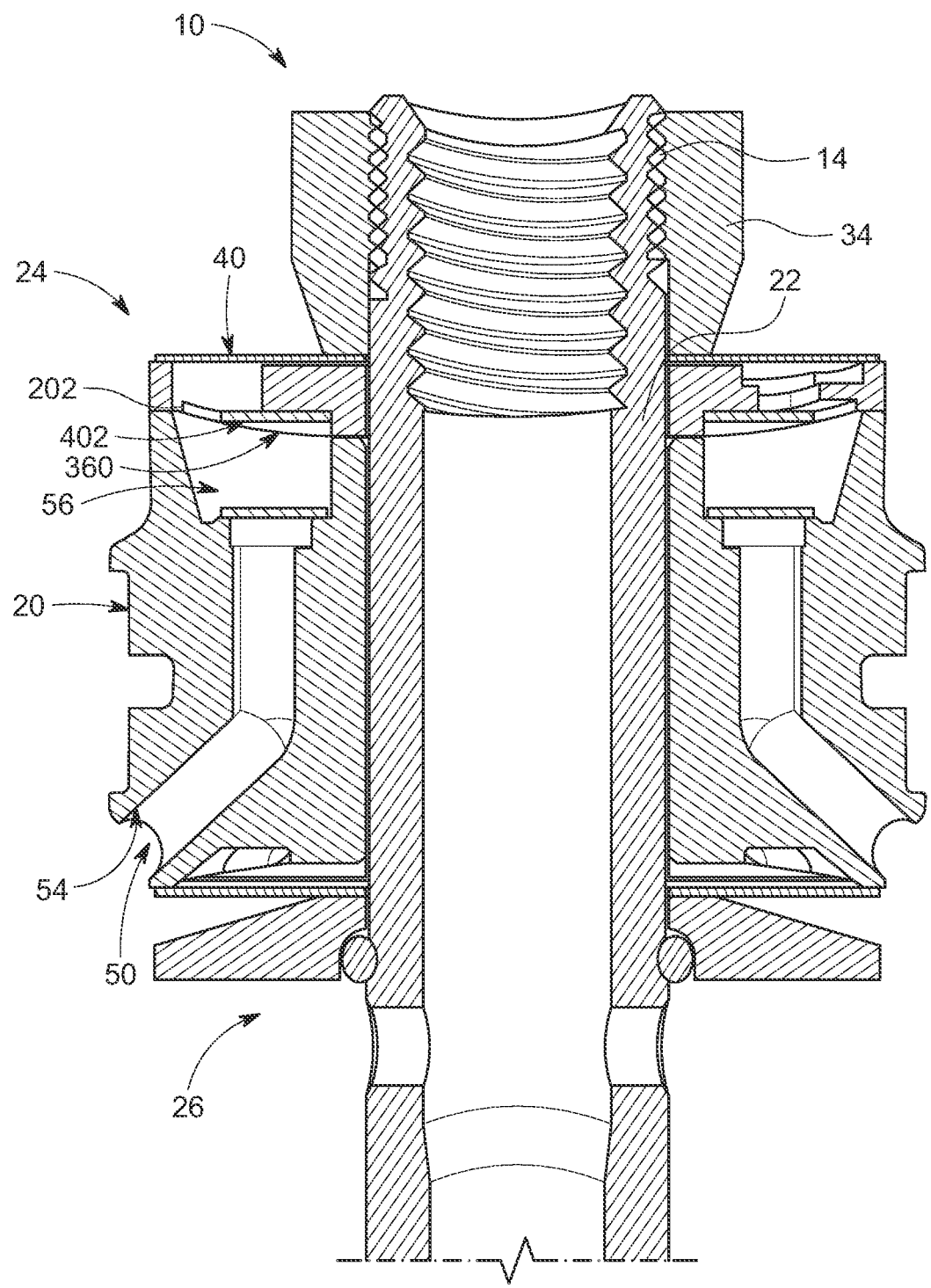
FIG. 5 is a pictorial illustration of a cross-sectional view of a shock absorber having a piston face as well as a shim on an underside of the piston face in accordance with an illustrative embodiment.

In order to dampen the travel of the piston 20 as the piston 20 oscillates through the fluid inside the shock absorber body 12, one or more shims 40 may be positioned at the rebound side 24 (e.g., as shown in FIG. 1 and FIG. 5) and/or compression side 26 of the piston 20 to help restrict flow therethrough. Specifically, the shims 40 cover the exhaust ports 56 and "open" or deflect away from the exhaust ports 56 as fluid flows through the ports from the intake ports 54. The shape, size, location, and quantity of ports 50, as well as the thickness, quantity, and combination of shims 40 determine how much fluid will flow through the piston 20 and the exhaust ports 56. The shims 40 come in a variety of diameters and thicknesses, and the combination of shims allows for independent tuning of rebound and compression dampening rates. For example, as the shim "stack" increases, the amount of force required to bend or flex the shims 40, and thus the dampening rate, increases. Once the shims 40 begin to deflect, fluid begins to pass through the piston 20 and past the shims 40. As the velocity of the piston 20 increases, the shims 40 continue to deflect until all of the exhaust ports 56 of the piston 50 are exposed. From this point, as piston velocity increases, the dampening force increases in a generally direct or linear relationship. Thus, a piston having this type of design is known as a linear piston. A graph 1102 of this relationship is shown in FIG. 11.

Figure 11:
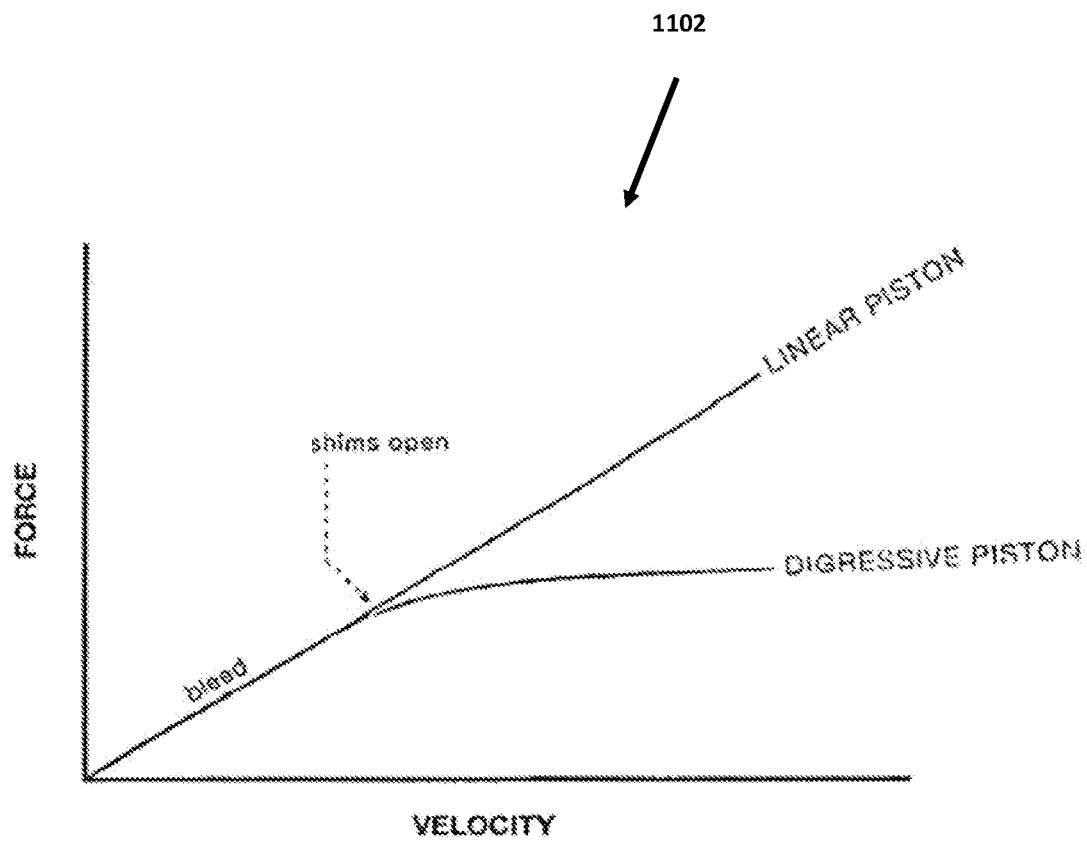
FIG. 11 is a prior art example graphical representation of the behavior of dampening forces and piston velocity for a linear piston and a digressive piston.

As shown in graph 1102 in FIG. 11, before the shims 40 open, however, a certain amount of fluid (oil) may be permitted to flow through the piston 40. This flow, known as bleed, allow for slow movement of the piston 20 without drastic movement of the piston 20 within the shock absorber body 12. Bleed can be determined by defining small openings or notches in one of the shims 40, which is known accordingly as a bleed shim, such as by machining, cutting, punching, stamping, or other methods, on the rebound side 24 and/or the compression 26 of the piston face 20. Alternatively, it is also possible to define a bleed hole or opening in the piston face 202, shown in FIG. 2. In a conventional linear piston, the cumulative number of openings in the bleed shims creates an overall bleed amount that is the same for both compression and rebound.

FIG. 11 also shows the relationship between dampening force and velocity for a full digressive piston, which does not define a series of openings but instead defines one opening around the circumference thereof, so that when the shims deflect, the shims deflect around the full (360 degree) circumference of the piston face. This is known as a full digressive piston design and is particularly suited for very high piston velocities where a linear piston could possibly break due to excessive dampening forces that result from the piston movement.

Another type of piston known as a progressive piston provides more dampening as the piston velocity increases. This is due to the flow pattern that is determined by the piston and ports defined thereby, in conjunction with the piston velocity and shims 40. As the number of openings for the fluid to pass through decreases, the more progressive the piston behaves. In some cases, if the piston velocity is too great, little to no fluid passes through the piston 20 and the dampening greatly increases.

Figure 2:
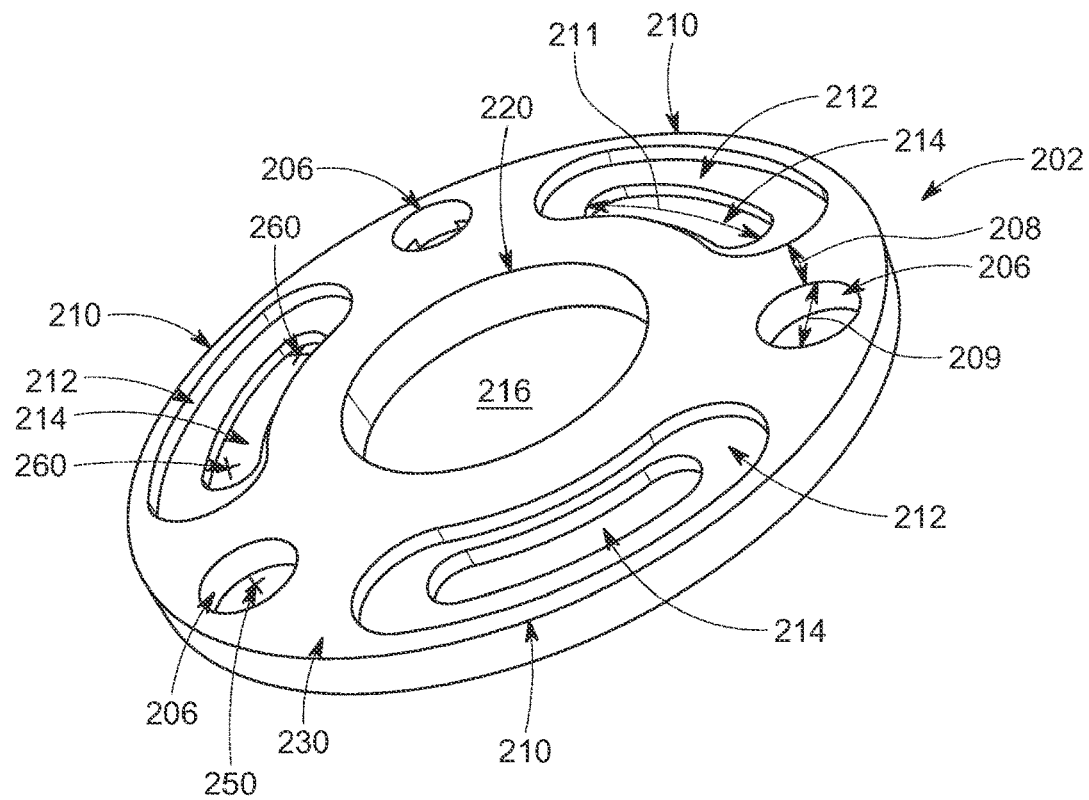
FIG. 2 is a pictorial illustration of a top perspective view of a piston face in accordance with an illustrative embodiment.
Figure 3:
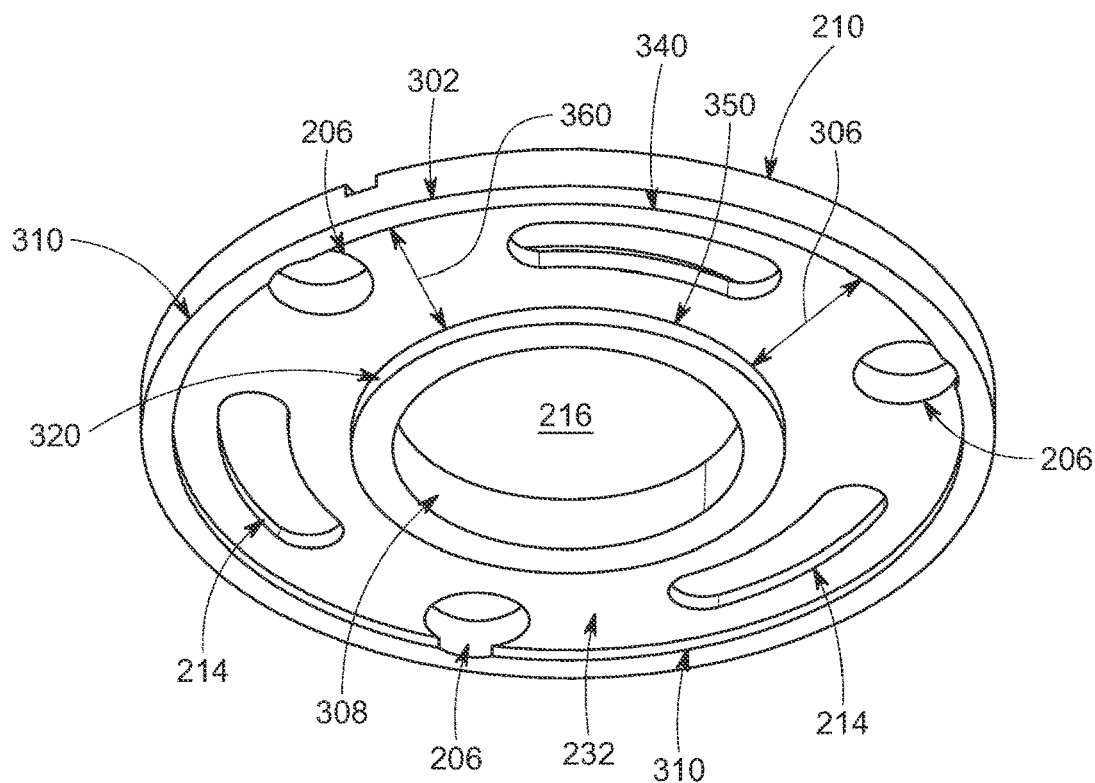
FIG. 3 is a pictorial illustration of a bottom perspective view of a piston face in accordance with an illustrative embodiment.

FIG. 2 and FIG. 3 show a unique piston face according to one or more non-limiting embodiments. FIG. 2 shows a top perspective view of piston face 202 and its structure and FIG. 3 shows a bottom perspective view of the piston face 202.

In one or more non-limiting embodiments, piston face 202 is a single piston face that is generally disc shaped. In a non-limiting embodiment, piston face 202 includes a top surface 230, a bottom surface 232, and a central bore or central opening 216. The piston face 202 further includes a series of first openings 206 and a series of second openings 214 that extend through the top surface 230 of the piston face 202 to the bottom surface 232 of the piston face 202. In one or more non-limiting embodiments, the diameter 209 of the first series of openings 206 is different from the diameter 211 of the second series of openings 214 in piston face 202. The reason for having different sized diameters 209 and 211 for the first set of openings 206 and the second set of openings 214 is to allow for a restricting fluid flow through the first set of openings 206 and the second set of openings 214 by the shim 402 shown in FIG. 4 as further explained below.

In addition to having different diameters 209 and 211, the first set of openings 206 and the second set of openings 214 have different shapes in the non-limiting embodiment shown in FIG. 2 and FIG. 3. The first set of openings 206 is a generally circular shape that extends from the top surface 230 of the piston face 202 to the bottom surface 232 of the piston face 202. In contrast, the second set of openings 214 has a more oblong shape as shown in FIGS. 2-3. Second set of openings 214 may be described as being kidney shaped in that second set of openings 214 and includes a long oval that is indented at one side. Further, the second set of openings 214 is recessed or offset 212 from the top edges 210 of the top surface 230 of the piston face 202. Additionally, the first set of openings 206 is separated by a gap or space 208 from the subsequent second set of openings 214.

In one non-limiting embodiment, first set of openings 206 and second set of openings 214 are arranged in alternative order on the piston face 202, such that a first opening 206 is located next to or proximate to a second opening 214 and then another first opening 206 is located next to that second opening 214 and so on and so forth. Piston face 202, as shown in FIGS. 2-3, includes three first set of openings 206 and three second set of openings 214, but in other embodiments, the number of first set of openings 206 and second set of openings 214 may be varied from that shown in FIGS. 2-3.

Figure 8:
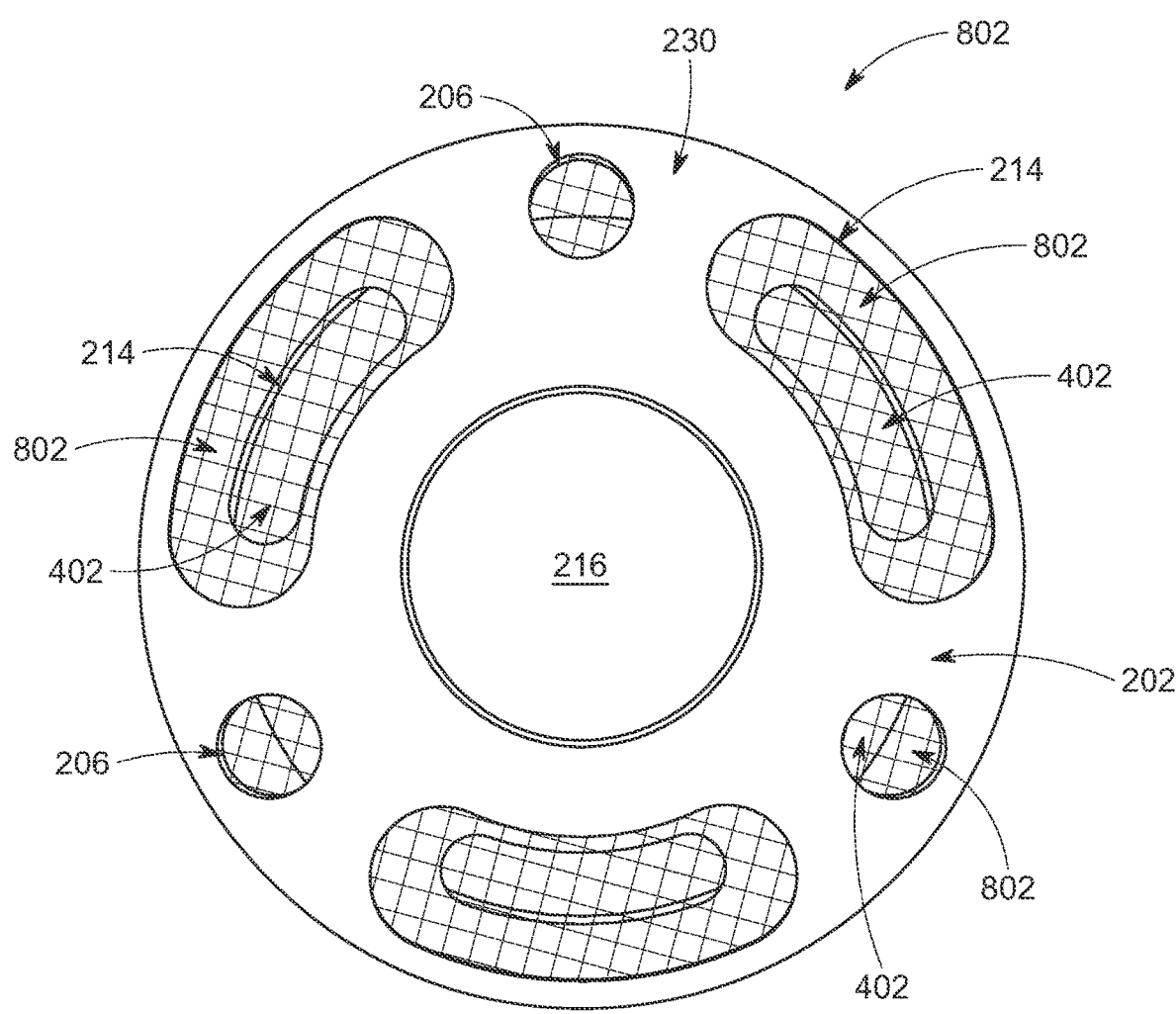
FIG. 8 is a pictorial illustration of the piston face of FIGS. 2-3 and the shim shown in FIG. 4 disposed beneath the piston face with less restricted fluid flow in accordance with an illustrative embodiment.
Figure 9:
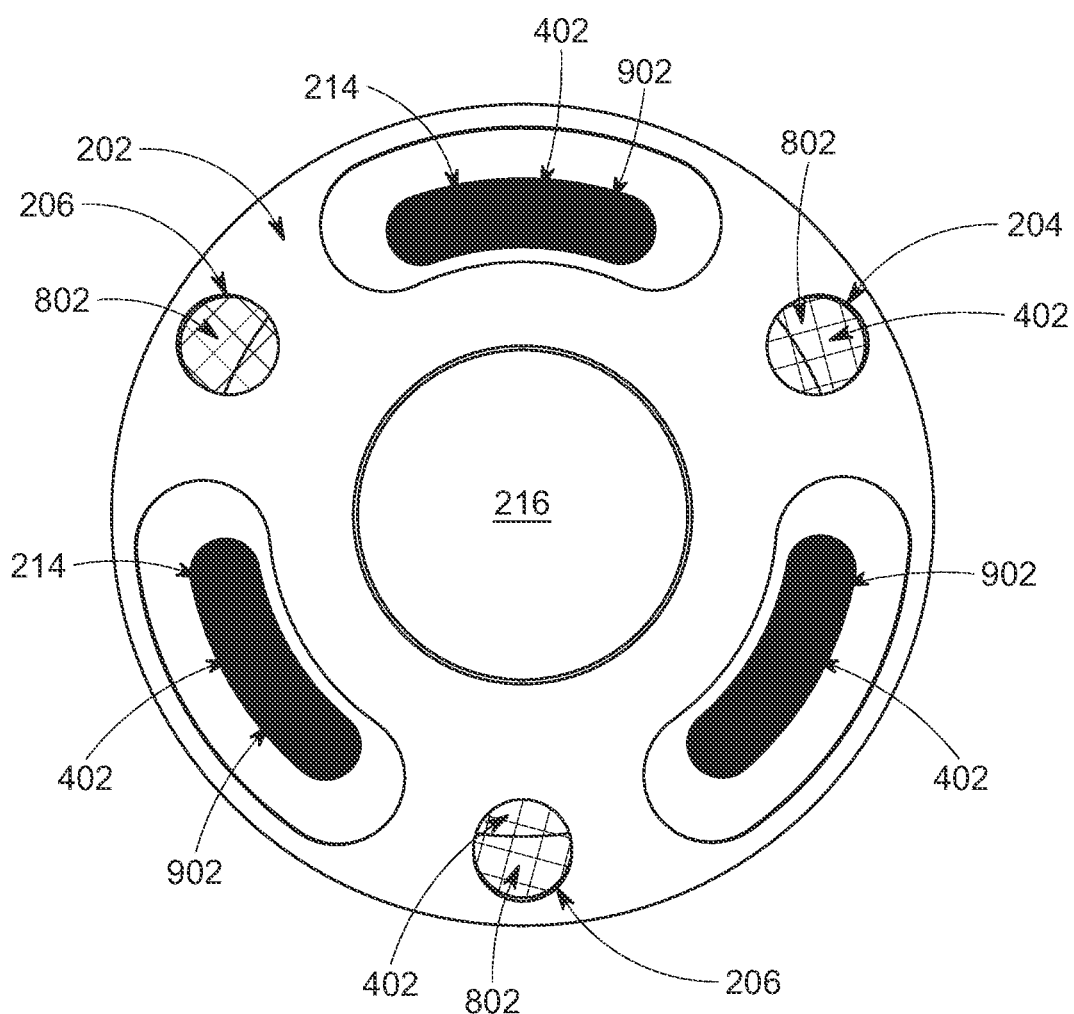
FIG. 9 is a pictorial illustration of the piston face of FIGS. 2-3 and the shim of FIG. 4 disposed beneath the piston face with restricted fluid flow in accordance with an illustrative embodiment.

It is noted that the shape of first set of openings 206 and second set of openings 214 is not limited to the circular shaped openings 206 or the oblong shaped openings 214. In other embodiments, these shapes and arrangements may be varied and include other shapes and configurations. Piston face 202 is exemplary of a piston face having ports (e.g., first set of openings 206 and second set of openings 214) that have different diameters 209 and 211 and sizes to allow for varying and restricting the amount of fluid (e.g., oil 802 as shown in FIGS. 8-9) that can pass through these ports 206 and 214 in a shock absorber, such as shock absorber 10 shown in FIG. 1.

The structure on the underside or bottom surface 232 of piston face 202, as shown in FIG. 3, differs from the top surface 230 of the piston face 202 in one or more non-limiting embodiments. As shown in FIG. 3, a bottom lip 310 extends downwardly and around the circumference of the piston face 202. The bottom lip 310 extends downwardly from the edges 302 of the bottom surface 232 of the piston face 202.

The underside 232 of piston face 202, as shown in FIG. 3, further includes a cylindrical portion or ridge 320 that protrudes downwardly from the center of the underside 232 of the piston face 202. The bore 216 of the piston face is defined by the interior 308 of the cylindrical portion or ridge 320 protruding from the bottom surface 232 of the piston face 202. The bottom surface 232 of the piston face 202 includes a radial body portion 306 that is defined by the bottom lip 310 and the cylindrical portion or ridge 320 that protrude downwardly and past the radial body portion 306 of the bottom surface 232 of the piston face 202.

Figure 7:
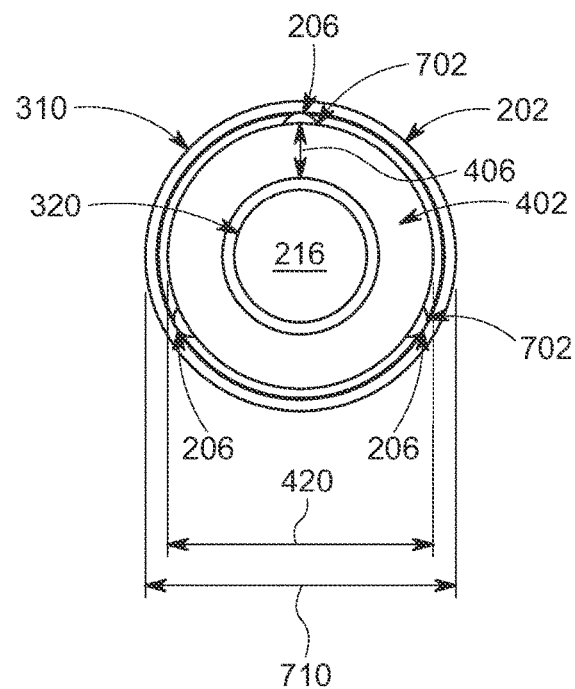
FIG. 7 is a pictorial illustration of the piston face of FIGS. 2-3 and the shim of FIG. 4 in direct contact with each other in accordance with an illustrative embodiment.

FIG. 3 illustrates that the second set of openings 214 is located between the interior edge 340 of the bottom lip 310 and outside edge 350 of the cylindrical portion of ridge 320, while first set of openings 206 slightly cut into the bottom lip 310. FIG. 7 shows more clearly that the first set of openings 206 are configured to cut into the bottom lip 310 at 702. Thus, the first set of openings 206 on the underside 232 of the piston face 202 are defined by the bottom lip 310 and the cylindrical portion 320, but the first set of openings 206 also cut into the bottom lip 310 to a certain degree. Accordingly, the centerline 250, as shown in FIG. 2, of the first set of openings 206 is not aligned with the centerline 260 of the second set of openings 214 because the first set of openings 206 is raised higher and located closer to the top outer edge 210 of the top surface 230 and the bottom outer edge 302 of the bottom surface 232 of the piston face 202. In other embodiments, these configurations for the first set of openings 206 and for the second set of openings 214 may be reversed or there may be other designs that do not require the first set of openings 206 to cut into the bottom lip 310.

The form and structure of the first set of openings 206 and the second set of openings 214 is designed to control fluid flow through a piston face 202 when mounted or otherwise secured to the piston shaft 14 and the piston 20 (e.g., as shown in FIG. 1 and in FIG. 5) and through the shock absorber body 12 in a particular manner so as to affect the dampening forces within the shock absorber 10 of FIG. 1 and FIG. 5.

FIG. 3 shows that piston face 202 includes taper 360 in one or more non-limiting embodiments. The taper 360 extends along the radial body 306 on the underside 232 of the piston face 202 from the interior edge of the cylindrical portion 320 to the inner edge of the bottom lip 310. The taper 360 extends completely around the underside 232 of the piston face 202 in a 360-degree direction. The taper 360 in the piston face 202 may be more visible in FIGS. 5-6. The function and form of the taper 360 is further discussed below and shown with respect to FIG. 5-9.

It is noted that the piston face 202 shown in FIG. 2 and FIG. 3 will work with any type of any type of piston 20 whether linear, progressive, or digressive, as long as the piston will mate to the surface 310 and 320.

Figure 4:
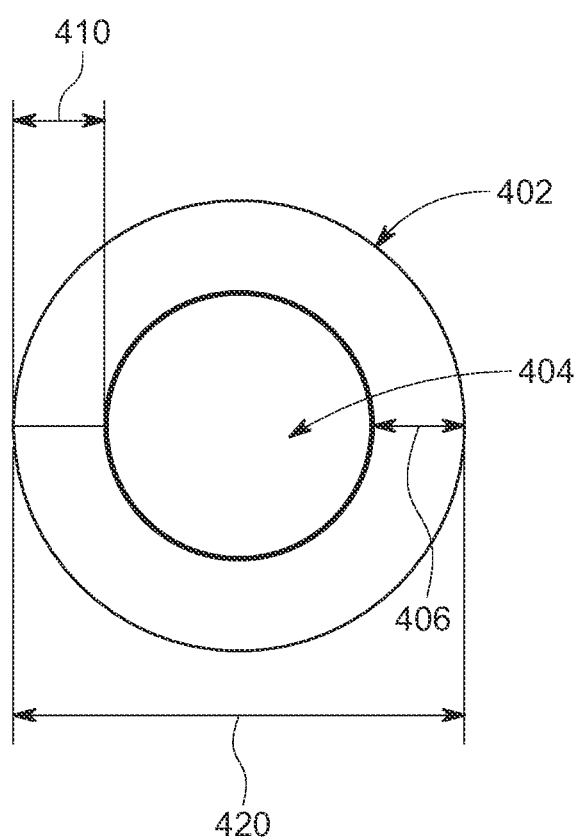
FIG. 4 a pictorial illustration of a shim in accordance with an illustrative embodiment.

Turning to FIG. 4, FIG. 4 displays a shim 402. Shim 402 is also referred to as a dampening shim in the present description. Shim 402 is shaped as a disc or ring and includes a central bore 404 that extends from the top surface of the shim 402 to the bottom surface of the shim 402. The shim 402 is symmetrical and does not include any openings along the radial body portion 406 of the shim 402. The radial body portion 406 of the shim 402 has a same thickness throughout the shim 402. A diameter 410 of the radial body portion 406 of the shim 402 is configured and sized such that the radial body portion 406 of the shim 402 is able to fully block an entirety of the diameter 211 of the second set of openings 214, which is shown in FIG. 9 and discussed later below. A portion of radial body portion 406 of the shim 402 partially blocks the first set of openings 206 as well as shown in FIG. 5-9.

FIG. 5 shows a cross sectional view of a system for the shock absorber 10 which incorporates the piston face 202 shown in FIGS. 2-3 and the shim 402 shown in FIG. 4. As shown in FIG. 5, and in accordance with the system shown in FIG. 1, the movable piston 20 is coupled via the nut 34 to the movable main shaft 14 within the cylindrical shock body 12 (e.g., shown in FIG. 1) of the shock absorber 10. In one or more non-limiting embodiments, the piston 20 may include a recessed area and a circumferential lip. The piston face 202 may be configured to be in communication with or releasably attached to the circumferential lip of the piston 20.

In the example configuration shown in FIG. 5, the piston face 202 is mounted or otherwise secured to the main shaft 14 via the nut 34 on the shock absorber 10 on the rebound side 24 of the piston 20 and opposite to the compression side 26 of the shock absorber 10. Further, piston face 202, as presented below in FIG. 2, is in communication with the exhaust ports 56 of the piston 20. It is noted that in alternate configurations the piston 20 may be machined so that the piston face 202 and underlying shim 402 are positioned and fitted to the compression side 26 of the piston 20. In other configurations, a piston face 202 and underlying shim 402 may be positioned on both the rebound side 24 and the compression side 26 of the piston 20.

Figure 6:
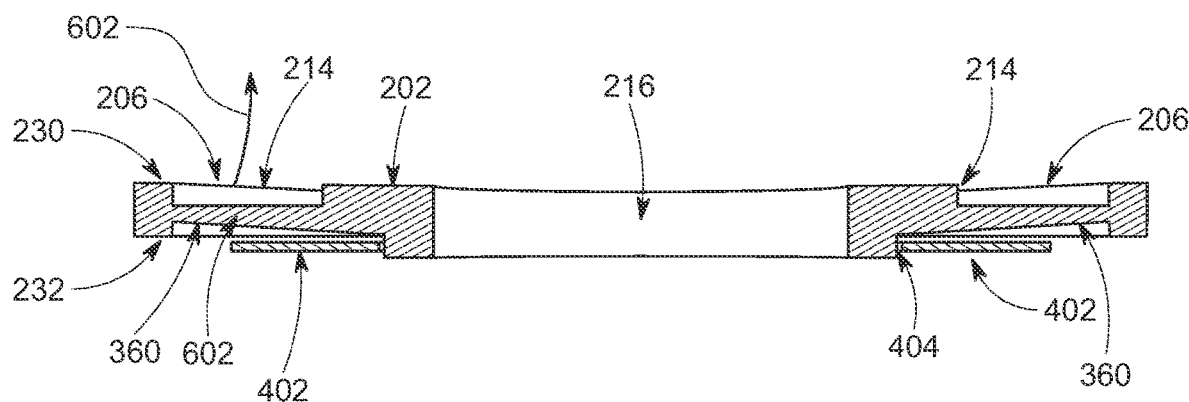
FIG. 6 is a cross-sectional view of the piston face of FIGS. 2-3 and the shim of FIG. 4 in accordance with an illustrative embodiment.

The shim 402 is mounted or otherwise secured beneath the piston face 202 and to the piston 20. The piston face 202 includes taper 360, as described above with respect to FIG. 3, which extends along the radial body 306 of the piston face 202 on the underside 232 of the piston face 202, as shown in FIG. 3. The taper 360, as shown in FIG. 6, angles down from the bottom lip 310 of the piston face 202 towards the cylindrical portion 320 of the piston face 202. The function of the taper 360 is to provide a properly shaped surface area that allows the underlying shim 402 to deflect and bend up towards the bottom surface 232 of the piston face 202 when the hydraulic oil flowing through the shock absorber 10 is flowing at a minimum velocity level and provides enough fluid pressure against the surface of the shim 402 that causes the shim 402 to bend and deflect, which is referred to herein as being in a closed position.

Accordingly, the shim 402 may be in an open position or a closed position. In an open position, the shim 402 is lying flat, as shown in FIG. 6, and is not bent or deflected towards the bottom surface 232 of the piston face 202. In the open position, the fluid oil in the shock absorber 10 is able to flow through both the first set of openings 206 and the second set of openings 214 of the piston face 202. In a closed position, the shim 402 is bent or deflects upward towards the bottom surface 232 of the piston face 202 and along the direction of the taper 360 on the bottom surface 232 of the piston face 202. As further discussed below and as shown in FIG. 8 and FIG. 9, when the fluid velocity of the oil reaches a threshold level, the shim 402 can no longer stay flat and in an open position. Rather, the fluid pressure of the oil causes the shim 402 to bend and deflect upwards into the open surface area of the taper 360 on the bottom side 232 of the piston face 202. When this bending and deflecting of the shim 402 occurs, the body 406 of the shim 402 fully blocks the second set of openings 214 of the piston face 202, but only partially blocks the first set of openings 206, as shown in FIG. 9. In this manner, fluid flow is restricted because the fluid cannot fully travel through the second set of openings 214 and is only able to travel through a part of the first set of openings 206. In the closed position, the shim 402 partially blocks the first set of openings 206 in the design shown in FIGS. 1-9. In other embodiments, it may be possible that none of the first set of openings 206 are blocked by the shim 402.

FIG. 8 shows that when the shim 402 is in an open position and is not bent and is able to stay flat, then the hydraulic fluid oil flowing through the shock absorber 10, can fully flow through the first set of openings 206 and through the second set of openings 214. In this manner, manipulating whether the shim 402 is in an open position (i.e., flat and away from the underside 232 of the piston face 202) or a closed position (i.e., bent and deflected towards the underside 232 of the piston face) can be used to restrict the free flow of fluid through the shock absorber 10 and thus affect the dampening forces of the shock absorber 10, as further explained below.

In FIG. 5, the central opening 22 of the piston 20 and the central opening 216 of the piston face 202 and the central opening 404 of the shim 402 are aligned because the main shaft 14 is slid through the openings or bores 22, 216, and 404, respectively of the piston 20, piston face 202, and the shim 402. The order of arrangement, as shown in FIG. 5, may be that the piston 20 is positioned on the shaft 14, and then the shim 402, and then the piston face 202 follows such that the shim 402 is located beneath the bottom surface 232 (e.g., as shown in FIG. 3) of the piston face 202. The piston 20, piston face 202, and underlying shim 402 located beneath the piston face 202 may be secured and tightened in place via the nut 34 on the shock absorber 10.

The fluid (e.g., oil) that is flowing through the shock absorber 10 may flow through the intake port 54 and/or other ports 50 of the shock absorber 10 and through the first set of openings 206, and the second set of openings 214 of the piston face 202, as shown in FIG. 2 and FIG. 3. The shim 402 shown in FIG. 5 is lying flat in the open position but is not in direct contact with the underlying bottom surface 232 of the piston face 202.

The shim 402 may act as a "pre-shim" to the compression shims 40 shown in FIG. 5. As noted previously with respect to FIG. 1, the use of one or more shims 40 on the rebound side 24 or the compression side 26 is well known with respect to shock absorbers 10. However, the addition of a shim 402 underneath a piston face 202 and prior to the one or more shims 40 disposed on either the rebound side 24 or the compression side 26 of the piston 20 has not been used before. Advantageously, the shim 402 and the piston face 202 may be used on either the rebound side 24 or the compression side 26 or both in some cases and is modular to suit the needs of each vehicle and each driver and each course or racetrack. The dampening forces may be manipulated in a way that has not been available previously and reduces the need to constantly change out shock absorbers 10 for a driver on a race course.

The shim 402 provides an additional means of manipulating the dampening forces offered by the shock absorber 10. When fluid flow through the piston face 202 is restricted, such that fluid cannot flow through the second set of openings 214 and can only flow through part of the first set of openings 206 because the underlying shim 402 is in the closed position, the one or more shims 40 on whichever selected side of the piston the piston face 202 and shim 402 are located (e.g. either the rebound side 24 or the compression side 26) have less fluid flow flowing against the one or more shims 40, which makes the shock absorber 10 respond with a higher dampening force and makes the one or more shims 40 on that respective side of the piston 20 (i.e., either the rebound side 24 or the compression side 26) seem stiffer.

FIG. 6 shows a cross sectional view of the shim 402 positioned beneath the piston face 202. The shim 402 shown in FIG. 6 is in an open position, because the shim 402 is flat and not bent towards the taper 360 of the piston face 202. The fluid path 602 of the fluid is shown such that the shim 402 is not blocking all of the second set of openings 214 of the piston face 202 or all of the first set of openings 206 of the piston face.

FIG. 7 shows for clarity a bottom view of a shim 402 in direct contact against the underside 232 of the piston face 202, as it would appear if the shim 402 is in the closed position or deflected and bent towards the underside 232 of the piston face 202. As shown in FIG. 7, when the piston face 202 is positioned above the shim 402, as would be the case when positioned in the shock absorber 10 and secured to the main shaft 14 of the shock absorber 10, as shown in FIG. 5, the shim opening or central bore 404 is aligned with the opening or central bore 216 of the piston face 202. Further, the radial body portion 406 of the shim 402 fits between the bottom lip 310 of the piston face 202, as shown in FIG. 3, and the circumferential ridge 320 that extends down from the bottom surface 232. The diameter 410 of the radial body portion 406 of the shim 402 is configured to fit between the bottom lip 310 and the circumferential ridge 320 of the piston face 202. Further, the outer diameter 420 of the shim 402 is smaller than or less than the outer diameter 710 of the piston face 202. Because the shim body 406 is sized as such to have a smaller outer diameter 420, the first set of openings 206 are only partially blocked and include a portion of the each of the first openings 206 through which fluid can flow even when the shim 402 is in its closed position, while the shim body 406 completely blocks the second set of openings 214. Further, as discussed above, the diameter 209 (e.g., as shown in FIG. 2) of the first set of openings 206 is different from the diameter 211 of the second set of openings 214 such that the shim 402 can fully block the second set of openings 214 if bent and pushed up against the bottom surface 232 of the piston face 202.

Additionally, as discussed above with respect to FIG. 2, the position of the first set of openings 206 is positioned such that the centerline 250 of the first set of openings 206 is higher than the centerline 260 of the second set of openings 214. Further, at 702, as shown in FIG. 7, the first set of openings 206 cuts into a portion of the bottom lip 310. Further, the piston face 202 includes taper 360 to allow space for the shim 402 to bend and deflect up towards the bottom surface 232 of the piston face 202. In a closed, deflected position, the shim 402 is able to fully restrict flow of fluid through the second set of openings 214 when the fluid velocity is high enough and the fluid pressure against the shim 402 is at a threshold level that causes the shim 402 to bend into the closed position and block fluid flow primarily through the second set of openings 214 and partially from the first set of openings 206.

Thus, all of the above described factors in the form and design of the piston face 202 and the shim 402 combine in such a way to allow for varying the available surface area for fluid flow of the ports (i.e., first set of openings 206 and second set of openings 214) of the piston face 202 and to vary dampening forces of the shock absorber 10 ultimately, as further discussed below.

As noted above, in other embodiments, piston face 202 may have different shapes and designs for first set of openings 206 and second set of openings 214 with varying diameters and designs. In particular, in any design, one set of ports or openings on the piston face 202 needs to completely be blocked by the shim 402 when the shim 402 is in the closed position in order to prevent fluid flow through this set of openings and another set of ports or openings on the piston face 202 is not fully blocked by the shim 402 or may not be blocked at all such that the fluid is able to flow through this set of openings.

FIGS. 8-9 further illustrate this effect of the shim 402 on the fluid flow of the hydraulic oil flowing through the shock absorber 10. FIG. 8 simulates the flow of fluid 802 in the combination of the piston face 202 and the shim 402 when the shim 402 is in an open position and not bent or deflected towards the bottom surface 232 of the piston face 202. FIG. 9 simulates the flow of fluid 802 in the combination of the piston face 202 and the shim 402 when the shim 402 is in the closed position and is, therefore, bent or deflected towards the bottom surface 232 of the piston face 202. The cross hatching shown in FIG. 8 and FIG. 9 is meant to represent fluid 802 (which is any type of usable oil for shock absorbers 10) that flows through the shock absorber 10 and past the shim 402 and the piston face 202 when in use. The solid, darkened areas 902 shown in FIG. 9 represent that the areas of the second set of openings 214 that are completely blocked by the shim body 406 (i.e., the shim 402).

As shown in FIG. 8, when the shim 402 is in an open position, fluid 802 in the shock absorber 10 can flow through all of the first set of openings 206 and all of the second set of openings 214 of the piston face 202. In contrast, when the shim 402 is in the closed position, the second set of openings 214 on the piston face 202 are fully blocked (e.g., as shown at 902 in FIG. 9) and fluid 802 is restricted from flowing through the second set of openings 214.

As shown in FIG. 8, when the shim 402 is in the open position, the fluid 802 can push past the underlying shim 402 and through the available space in the first set of openings 206 and the second set of openings 214 of the piston face 202. Notably, when the velocity of the fluid reaches and exceeds a minimum threshold level due to the corresponding high velocity of the piston rod 14 and piston 20 in the shock absorber 10, then the shim 402 bends and deflects and is in the closed position. In the closed position, the shim 402 blocks the entirety of all of the second set of openings 214 but only partially blocks the first set of openings 206. A graph 1202 of this relationship is shown in FIG. 12.

Figure 12:
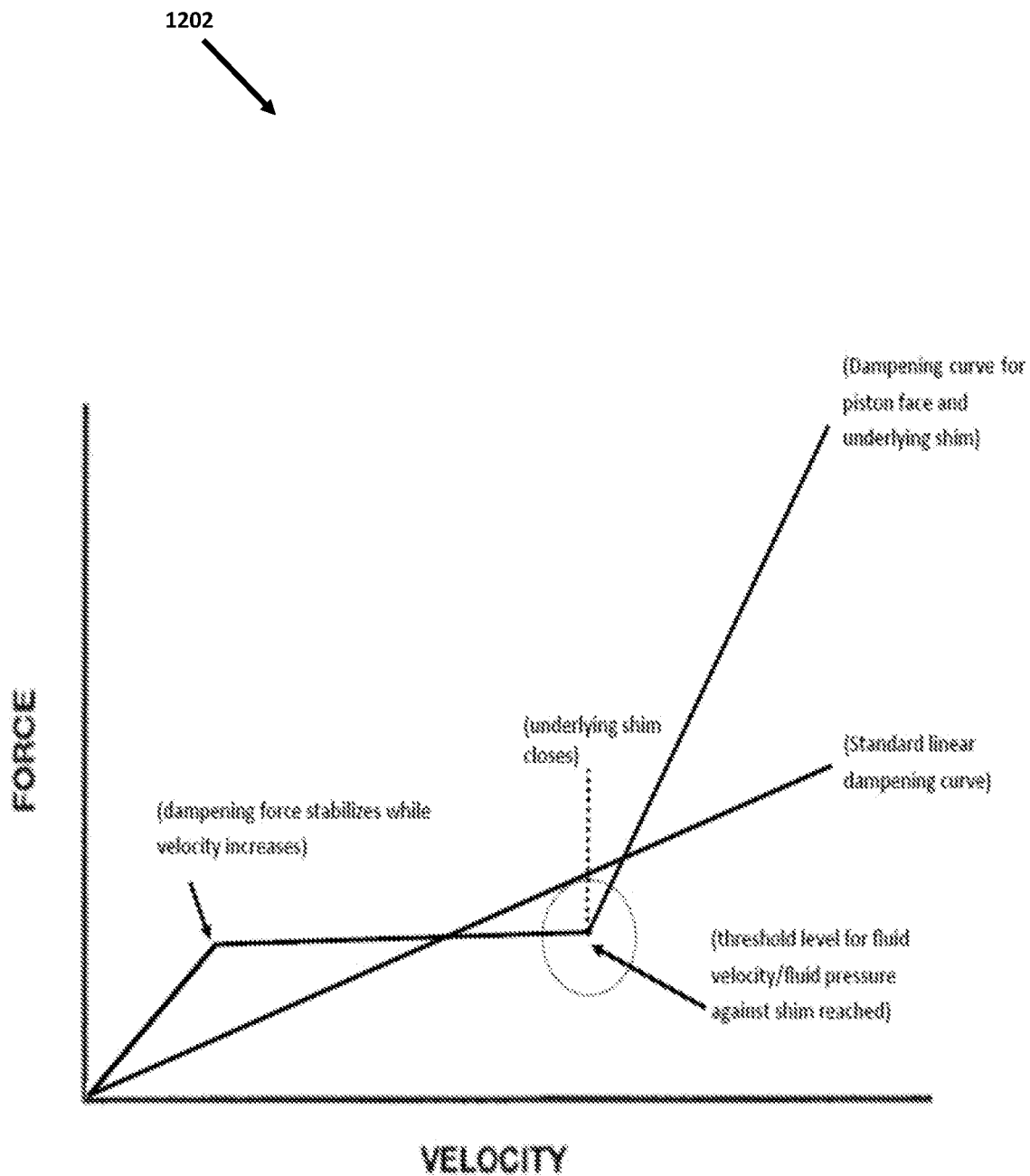
FIG. 12 is an example graphical representation of the behavior of the velocity and dampening forces for the piston face and underlying shim of the present description.

The graph 1202 shown in FIG. 12 shown illustrates a standard linear dampening curve for conventional shock absorbers that do not include the piston face 202 and underlying shim 402 dampening assembly combination. The graph 1202 shown in FIG. 12 also shows the dampening curve for shock absorbers, such as shock absorber 10 shown in FIG. 5, that do include the piston face 202 and underlying shim 402 dampening assembly combination. The term "FORCE" shown on the left side of the graph represents the dampening force of the shock absorber and the term "VELOCITY" on the bottom of the graph represents the velocity of a piston 20 in a shock absorber 10 as shown in FIGS. 1 and 5. As noted above, the velocity of the fluid oil in the shock absorber 10 corresponds to the velocity of the piston 20 and the piston rod 14.

For conventional shock absorbers (i.e., without a piston face 202 and shim 402), the dampening curve indicates that as the velocity of the piston 20 increases, the dampening force also increases in a generally linear fashion. In contrast, the example graph shown in FIG. 12 shows that for the dampening assembly shown in FIGS. 1-9, the combination of the piston face 202 and the shim 402 has a different dampening curve. As the piston 20 velocity increases, the dampening force for the piston face 202 and the shim 402 assembly also increases linearly until the dampening force reaches a point whereby the dampening force provided by the shock absorber 10 remains stable (as indicated by the arrow in the graph) even while the velocity of the piston 20 increases. However, at a certain point, when a threshold velocity of the piston 20 and the fluid is reached, the dampening forces provided by a shock absorber 10 having the piston face 202 and the underlying shim 202 increases significantly and very quickly. The dampening forces in the shock absorber 10 increase quickly, as shown by the graph 1202 in FIG. 12, because the underlying shim 402 converts from being in an open position (e.g., flat as shown in FIGS. 5-6) to being in a closed position (e.g., bent and deflected as shown in FIG. 7) The graph 1202 shown in FIG. 12 reveals various important characteristics for a shock absorber 10 having the piston face 202 and underlying shim 402. When the piston 20 velocity increases, the velocity of the fluid increases as does the fluid pressure against the piston 20 and the piston face 202 and the shim 402 and eventually causes the shim 402 to bend and deflect against the tapered bottom surface 232 of the piston face 202. It is noted that the graph 1202 shown in FIG. 12 is one kind of dampening curve provided by the combination of the piston face 202 and the shim 402. If additional ports are added to the piston face 202 and bleed valves, other dampening curves may be produced and the dampening forces of the shock absorber 10 may be manipulated.

The design of the piston face 202 and the shim 402 allow for high fluid flow for a period of time with low dampening forces being applied by the shock absorber 10. Once the shim 402 closes, the dampening force of the shock absorber 10 increases significantly and very quickly, which results in a much stiffer shock absorber 10 offering higher dampening forces.

Accordingly, the shock absorber 10 responds with a higher resistance dampening force which is particularly useful as discussed above when vehicles are used on racecourses (including but not limited to dirt racetracks). Racing tracks have varied surfaces, including rough, uneven terrain and smooth slick terrain. For the smooth, slick terrain of a racetrack, the race car driver needs a shock absorber 10 that does not offer too much dampening force as driver is controlling the vehicle on the smoother terrain, even if the vehicle is moving at a high speed. However, when the ground is rough and includes many potholes, bumps, or other uneven types of terrain, then the race car drivers needs the shock absorber 10 to provide greater dampening forces to properly control the suspension system of the vehicle and to keep the tires of the vehicle on the ground and provide control to the driver.

Prior to the piston face 202 and the shim 402 shown in FIGS. 1-9, in particular at racecourses and racetracks, shock absorber specialists had to have multiple shock absorbers on hand and regularly change out the shock absorbers that provide either higher dampening forces or lower dampening forces for a particular segment or portion of a racetrack. The combination of the piston face 202 and the underlying shim 402 coupled to the piston 20 in a shock absorber 10, as shown in FIGS. 1-9, minimizes or avoids completely the need for changing out the shock absorbers constantly on a racetrack in order to provide the varied dampening forces needed to correspond to changing conditions of the racetrack surface (i.e., whether the surface is rough and uneven or smooth or slick). Because of the inclusion of the piston face 202 and underlying shim 402, the shock absorber 10 provides a higher dampening force when the shock absorber 10 begins moving faster (i.e., the piston 20 and the piston rod 14 and the fluid in the shock absorber 10 are also moving faster) which is what occurs when a vehicle travels over uneven terrain including potholes and bumps. Advantageously, the same shock absorber 10 is able to provide lower dampening forces when the shock absorber 10 is moving slower (i.e., the piston 20 and the piston rod 14 and the fluid in the shock absorber 10 are also moving at a slower rate), which is helpful for racetrack drivers and dirt track race car drivers in particular when traveling over smoother and slicker surfaces that do not require as much dampening force from the shock absorber 10.

Figure 10:
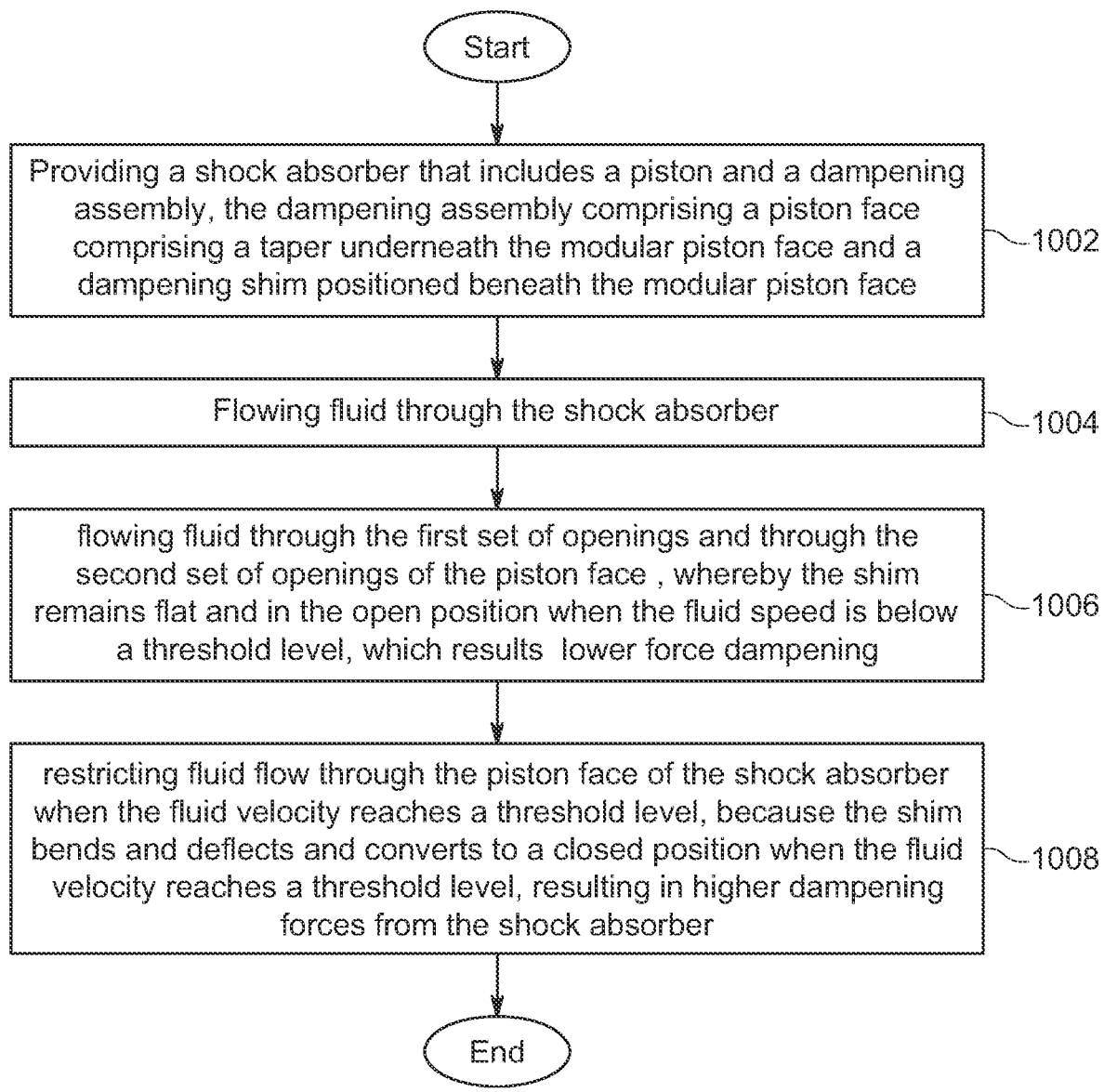
FIG. 10 is a flowchart of an exemplary method of use of a shock absorber in accordance with an illustrative embodiment.

FIG. 10 is a flowchart of an exemplary method of using a shock absorber, such as shock absorber 10, which includes piston face 202 and shim 402. At step 1002, the method may include providing a shock absorber 10 that includes a piston 20 and a dampening assembly, as shown in FIG. 5-9, whereby the dampening assembly includes a piston face 202 comprising a taper 360 underneath the piston face 202 and a dampening shim 402 positioned beneath the piston face 202 on the piston rod or shaft 14 in the shock absorber 10.

At step 1004, the method includes flowing fluid (e.g., fluid 802 shown in FIG. 8-9), such as a hydraulic oil suitable for shock absorbers 10, through the shock absorber 10. At step 1006, the method includes allowing the fluid to flow through the first set of openings and through the second set of openings of the piston face 202, whereby the shim 402 remains flat and in the open position when the fluid speed is below a threshold level, which results in high fluid flow in the shock absorber 10 and lower force dampening. This type of dampening force may be ideal when the surface of a track or road, including racetracks such as dirt racetracks or any kind of racetrack, when the vehicle needs to move at a high speed but the surface is smooth and slick. It is preferable for the vehicle to be able to move quickly without too much stiffness and resistance from the suspension system of the vehicle if the surface of the track is smooth and not rough.

At step 1008, when the fluid velocity reaches a threshold level, the method includes restricting fluid flow through the piston face 202 of the shock absorber 10, because the shim 402 bends and deflects and converts to a closed position when the fluid velocity reaches a threshold level and causes the shim to deflect and bend. In the closed position, the shim 402 completely blocks an entirety of the second set of openings 214, which results in higher force dampening by the shock absorber. Having a higher force dampening from the shock absorber 10 and thereby having a stiffer suspension system may be ideal for surfaces of a track that require more resistance and stiffness from a suspension system and higher grip levels on the track.

Advantageously, shock absorber 10 with its integrated piston face 202 and underlying shim 402 provides improved handling of a vehicle and provides the accurate, necessary amount of dampening forces to the suspension system of a vehicle based on the conditions of a racetrack or other type of road surface. The shock absorber 10 provides the right amount of compression to hold the tires of a vehicle to the ground, with enough stiffness to do so, while still allowing for the shock absorber 10 to be soft and not overly stiff when the track surface is smooth and slick and does not require as much dampening force from the shock absorber 10 to the vehicle's suspension system. Many other advantages and benefits are provided by one or more components described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A shock absorber, the shock absorber comprising:
   a shock absorber body;
   a piston rod;
   a piston coupled to the piston rod, wherein the piston includes a central opening through which the piston rod protrudes, wherein the piston has a compression side and a rebound side, wherein fluid is configured to flow through the piston;
   a piston face coupled to the piston, the piston face further comprising:
      a top surface, a bottom surface, and a central bore extending through the piston face;
      a bottom lip that extends downwards from the bottom surface of the piston face and that extends along a circumference of the piston face on the bottom surface of the piston face;
      a first set of openings;
      a second set of openings, wherein the first set of openings and the second set of openings extend from the top surface of the piston face to the bottom surface of the piston face;
      a cylindrical portion integrated into the bottom surface of the piston face that defines the central bore of the piston face;
      a taper that extends at an angle between the cylindrical portion and the bottom lip of the piston face,
      wherein the first set of openings and the second set of openings are disposed between the bottom lip and the cylindrical portion of the piston face; and
   a shim, wherein the shim includes a top surface, a bottom surface, and a central opening,
   wherein the piston rod is configured to be inserted through the central opening of the shim and then through the central bore of the piston face, and
   wherein the shim is configured to lay flat beneath the bottom surface of the piston face in an open position and to deflect and to bend upwards towards the bottom surface of the piston face in a closed position,
   wherein when the shim is in the closed position, the shock absorber provides higher force dampening than when the shim is in the open position.

2. The shock absorber of claim 1, wherein an outside diameter of the shim is less than an outside diameter of the piston face.

3. The shock absorber of claim 1, wherein the first set of openings has a different diameter than a diameter for the second set of openings and wherein a centerline of the first set of openings is not aligned with a centerline of the second set of openings.

4. The shock absorber of claim 1, wherein the shim is configured to deflect under fluid pressure from the fluid in the shock absorber, and upon reaching a threshold fluid speed from the fluid, the shim, in the closed position, is configured to deflect upwardly towards the bottom surface of the piston face, wherein the second set of openings become fully blocked by the shim so that fluid flow through the second set of openings is restricted.

5. The shock absorber of claim 1, wherein the first set of openings is generally circular shaped.

6. The shock absorber of claim 1, wherein the second of openings is generally kidney shaped and includes a long oval that is indented at one side.

7. The shock absorber of claim 6, wherein the second set of openings are recessed from the top surface of the piston face.

8. The shock absorber of claim 1, wherein one or more compression shims are coupled to the compression side of the piston, wherein the restricted fluid flow through the piston face causes the one or more compression shims to have reduced fluid flow, causing higher dampening force from the shock absorber.

9. The shock absorber of claim 1, wherein one or more rebound shims are coupled to the rebound side of the piston.

10. A dampening assembly for a shock absorber, the dampening assembly comprising:
  a piston face for the shock absorber, wherein the shock absorber includes fluid, a piston, and a piston rod, wherein the fluid flows between opposite sides of the piston, the piston face comprising:
    a top surface, a bottom surface, and a central bore extending through the piston face;
    a bottom lip that extends downwards from the bottom surface of the piston face and extends along a circumference of the piston face on the bottom surface of the piston face;
    a first set of openings;
    a second set of openings, wherein the first set of openings and the second set of openings extend from the top surface to the bottom surface of the piston face;
    a cylindrical portion integrated into the bottom surface of the piston face that defines the central bore of the piston face; and
    a taper that extends at an angle between the cylindrical portion and the bottom lip of the piston face,
    wherein the first set of openings and the second set of openings are disposed between the bottom lip and the cylindrical portion of the piston face; and
  a shim, wherein the shim includes a top surface, a bottom surface, and a central opening,
  wherein the piston rod is configured to be inserted through the central opening of the shim and then through the central bore of the piston face,
  wherein the shim is configured to lay flat beneath the bottom surface of the piston face in an open position and to deflect and to bend upwards towards the bottom surface of the piston face in a closed position,
  and wherein when the shim is in the closed position, the shock absorber provides higher force dampening than when the shim is in the open position.

11. The dampening assembly of claim 10, wherein the first set of openings has a different diameter than a diameter for the second set of openings and wherein a centerline of the first set of openings is not aligned with a centerline of the second set of openings.

12. The dampening assembly of claim 10, wherein an outside diameter of the shim is less than an outside diameter of the piston face, and further wherein the central opening of the shim is configured to align with the central bore of the piston face.

13. The dampening assembly of claim 10, wherein the shim is configured to deflect under fluid pressure from the fluid in the shock absorber, and upon reaching a threshold fluid velocity from the fluid, the shim, in the closed position, is configured to deflect upwardly towards the bottom surface of the piston face, wherein the second set of openings become fully blocked by the shim.

14. A method of varying dampening forces in a shock absorber, the method comprising:
  providing the shock absorber comprising a piston, a piston rod, and a dampening assembly, the dampening assembly comprising:
    a piston face comprising:
      a top surface, a bottom surface, and a central bore extending through the piston face;
      a bottom lip that extends downwards from the bottom surface of the piston face and that extends along the circumference of the piston face on the bottom surface of the piston face;
      a first set of openings;
      a second set of openings, wherein the first set of openings and the second set of openings extend from the top surface to the bottom surface of the piston face, wherein the first set of openings has a different diameter than a diameter for the second set of openings and wherein a centerline of the first set of openings and a centerline of the second set of openings is not aligned;
      a cylindrical portion integrated into the bottom surface of the piston face that defines the central bore of the piston face; and
      a taper that extends at an angle from the cylindrical portion toward the bottom lip,
      wherein the first set of openings and the second set of openings are disposed between the bottom lip and the cylindrical portion of the piston face; and
    a shim, wherein the shim includes a top surface, a bottom surface, and a central opening, wherein the piston rod is configured to be inserted through the central opening of the shim and then through the central bore of the piston face,
    and further wherein the shim is configured to be positioned beneath the piston face;
  flowing fluid through the shock absorber;
  if fluid velocity from the fluid is lower than a threshold level, flowing the fluid through the first set of openings and through the second set of openings, which results in low force dampening from the shock absorber, wherein the shim is in an open position and remains flat and unbent; and
  if fluid velocity from the fluid is higher than a minimum threshold, restricting flow of the fluid via the shim which converts to a closed position by bending and deflecting towards the bottom surface of the piston face,
  wherein the shim fully blocks the second set of openings, thereby restricting fluid flow through the shock absorber, resulting in higher force dampening from the shock absorber.

15. The method of claim 14, further comprising providing the shock absorber for a vehicle, the vehicle comprising an automobile or a motorcycle or a utility task vehicle (UTV).

16. The method of claim 14, further comprising configuring the shock absorber to provide varying dampening forces based on a velocity of the piston, a velocity of the piston rod, and a velocity of the fluid within the shock absorber.

17. The method of claim 16, further comprising providing a low force dampening from the shock absorber when the piston rod and the fluid in the shock absorber is moving at a lower velocity.

18. The method of claim 17, wherein the low force dampening from the shock absorber is desirable when driving on a smooth surface so that a suspension system of the vehicle is not overly stiff, and the vehicle is easier to maneuver.

19. The method of claim 16, further comprising, providing a higher force dampening from the shock absorber when the piston rod and the fluid in the shock absorber are moving at a higher velocity.

20. The method of claim 19, wherein the higher force dampening from the shock absorber is preferable when a track surface on which a vehicle having the shock absorber is driving on is rough and includes uneven surfaces.

\* \* \* \* \*